Patented Feb. 6, 1945

2,369,106

UNITED STATES PATENT OFFICE 2,369,106

PROCESS FOR HYDROGENATION OF CARBON MONOXIDE

Heinrich Heckel, Dinslaken, and Otto Roelen, Oberhausen-Holten, Germany; vested in the Alien Property Custodian No Drawing. Application November 30, 1940, Serial No. 368,088. In Germany December 9, 1939

2 Claims. (Cl. 260—449.6)

In industry the hydrogenation of carbon oxide by activating catalysers composed of iron or containing iron with the aid of oxygen compounds of calcium or manganese is well known. Until now only small amounts of Ca or Mn have been added and the contact mixtures have generally been prepared by mixing or melting the different substances together. For instance, up to the present an amount of only 0.5% of CaO has been added; and sometimes at the same time other metals, e. g. copper, have been added as well. The durability of these iron catalysers activated with Mn or Ca was, however, so short that no industrial use was made of them.

In contrast with the information in the technical literature on the limited possibilities of such iron catalysers, it has now been found that the special activity and durability of these catalysers is surprisingly increased when the different substances are not mixed mechanically or melted together, but are instead precipitated together from suitable salt solutions; the quantitative proportions being so chosen that the finally obtained iron contacts contain at least 2% and preferably more than 5% calcium and/or manganese. It is hardly possible to give a maximum limit for the addition of calcium- and manganese compounds, since with mixtures, composed of equal parts of iron oxide and calcium oxide, good synthesis results are still obtained.

The preparation of the new iron contacts containing manganese oxide and/or calcium oxide cannot be made arbitrarily. For instance, one cannot prepare active iron catalysers by precipitation with alkali carbonate, as is possible for cobalt. Preferably, one starts with nitrate- or chloride solutions and precipitates them with the aid of alkali hydroxides, in particular with sodium hydroxide. The precipitated metal hydroxide mixture is washed, dried, and subjected to a suitable forming operation.

It is advisable to impregnate with an alkali hydroxide solution after, or just before the end of the washing. Moreover, it has been found useful to add small quantities of nickel, cobalt or copper in order to diminish the starting time (induction period) of the contact. According to the invention the quantities added vary from 2 to 5%.

The desired small quantities of nickel, cobalt or copper may be incorporated with the catalyst by conventional methods, for example by impregnating the contact mass after washing with solutions of nickel, cobalt or copper salts and thereafter heating the impregnated mass to convert the salts to the corresponding oxides.

The following examples show in the normal as well as in the medium pressure synthesis the surprisingly good properties obtained with the new iron contacts prepared and composed according to the invention.

In order that one may appreciate the satisfactory practical results that are obtained, first two synthesis experiments are given which were made the first with an iron contact as used up to date, the second with a precipitated but not activated iron contact.

Fischer and Tropsch described in the "Gesammelten Abhandlungen zur Kenntnis der Kohle," volume 10 (1932) on page 389 a catalyser, which consisted of four parts Fe and one part Cu and which was activated with 0.5% $CaCO_3$. The calcium carbonate was mixed with the metal oxides in a dry state. The catalyser was used in powder form for the conversion of watergas under normal pressure. The maximum contractions obtained in the volume of the reacting gas after 21 working hours amount to 10% and after 70 working hours to 6%. After 996 working hours the catalyser was completely inactive. The yield of oil amounted to about 0.64 g. per $m.^3$ of synthesis gas under normal conditions.

It was found that this very unsatisfactory iron contact was far surpassed by a catalyser which, without any addition of activating substances, was precipitated according to the invention with the aid of alkali hydroxide from a nitrate solution. When using this catalyser for the conversion of watergas under normal pressure and a working temperature of 245° C. (=473° F.), after 534 working hours it obtained a maximum contraction of 17%, which was reduced to 5% after 726 working hours. The maximum yield of oil amounted to 21 $cm.^3$ per $m.^3$ of watergas.

In contrast with these two carbon oxide hydrogenation contacts, the following results were obtained with the catalysers prepared according to the invention, which not only contained sufficient quantities of calcium and/or manganese, but were also prepared by precipitation with alkali hydroxide.

Example 1

A contact which consisted of 100 parts Fe and 10 parts Ca in the form of their oxides and which was prepared by precipitation with alkali hydroxide from the salt solutions, was used for the conversion of watergas under normal atmospheric pressure and a working temperature of 245° C. (=473° F.). It gave, when 4 liter per hour of gas was passed over and 40 $cm.^3$ contact volume was used, a maximum contraction of 35% and a maximum yield of 42 cm.$^3$ oil per m.$^3$ watergas. After 796 working hours the contraction still amounted to 31% and after 1468 working hours it had only sunk to 26%.

The term "contraction," as used in this and the succeeding examples will be understood to mean the percentage difference between the initial volume of gas introduced into the contact zone and the final volume of gas leaving said zone.

Since the way in which the contacts are prepared has a very important bearing on the activity of the new iron catalysers, the exact conditions for their preparation are given hereunder:

25 g. Fe in the form of Fe(NO$_3$)$_3$.9H$_2$O and 10 g. Ca in the form of Ca(NO$_3$)$_2$ were dissolved in 600 g. H$_2$O and heated to boiling point. 425 cm.$^3$ of a 40%-sodium hydroxide solution (spec. grav. 1.438) were added to the boiling solution. After stirring for a short time the precipitate was sucked off by means of a vacuum filter and washed twice on it, each time with 350 cm.$^3$ of hot water.

Example 2

A mixed iron contact, which at a high temperature was precipitated with sodium hydroxide from a nitrate solution and contained 70 parts Fe and 30 parts Ca in the form of their oxides, was used for the carbon oxide hydrogenation under the conditions mentioned in Example 1. A maximum contraction of 35%, and a maximum yield of oil amounting to 28 cm.$^3$ per m.$^3$ watergas was obtained. After 804 working hours a contraction of 20% still could be observed.

Example 3

Under the same working conditions as mentioned in Example 1 an oxide contact, consisting of 50 parts Fe and 50 parts Ca, was used for the conversion of watergas. The maximum contraction obtained amounted to 31%, the maximum yield of oil to 35 cm.$^3$ oil per m.$^3$ watergas. After 852 working hours a contraction of 21% could still be observed.

Example 4

Also under normal pressure and under the above mentioned working conditions a precipitated contact was used for the conversion of watergas which contact contained 100 parts Fe, 25 parts Ca and 25 parts Mn in the form of oxides. During the synthesis a maximum contraction of 30% was obtained and an oil yield of up to 45 cm.$^3$ per m.$^3$ watergas. After 898 working hours the contraction amounted to 23%.

Example 5

A contact which was obtained by precipitation and which contained 5 parts Mn to 95 parts Fe in the form of oxides, was used for the conversion of watergas under the working conditions mentioned in the above examples. A maximum contraction of 38% was obtained and a maximum oil yield of 53 cm.$^3$ per m.$^3$ watergas. After 267 working hours a contraction of 33% could still be observed.

While the above data refer exclusively to the synthesis under normal pressure, the following examples show the effect of the activated iron contacts prepared according to the invention in the pressure synthesis.

Example 6

A catalyser, which was prepared by precipitation as described above and which consisted of an oxide mixture containing 10 parts Ca to 90 parts Fe, was used. This catalyser was started with watergas at 270° C. (=518° F.) and at normal pressure and, after a 25% contraction had been obtained, an overpressure of 10 atm. was applied. As starting material watergas was used, which was passed over the contact without circulation. Per m.$^3$ active gas 80–100 g. synthetic products were obtained, including "gasole" (Volatile unsaturated hydrocarbons). The quantity of these gasole amounted to 30–50% of the synthetic yield. The liquid synthetic products contained 50% gasoline, 20% Diesel oil and 30% paraffine.

Instead of starting with watergas one can also use a gas containing more hydrogen, for instance synthesis gas 1:2. Finally, instead of starting the catalysers at normal pressure, one can first partially reduce them through a treatment with hydrogen between 200° C. (=392° F.) to 300° C. (=572° F.) and apply them at once under higher pressure.

Example 7

An oxide catalyser prepared according to the invention containing 33 parts Ca to 100 parts Fe was started under normal pressure with watergas at 236° C. (=457° F.) and, after a 30% contraction was obtained, put into working in a circulating proportion of 1:2.5 under a synthesis pressure of 20 atm. overpressure. A contraction of 60–65% and a conversion of 75–80% of the carbon oxide was obtained. The yield amounted to 130 g. synthesis products per m.$^3$ active gas. The liquid hydrocarbons which were obtained consisted of 60% gasoline, 20% Diesel oil, and 20% paraffine.

Example 8

A precipitated oxide contact, containing 50 parts Fe and 50 parts Ca, was put into working under normal pressure with watergas at 270° C. (=518° F.) and, after a 25% contraction had been obtained, a synthesis pressure of 10 atm. overpressure was applied. The synthesis gas was passed over the contact with a circulating proportion of 1:8 to 1:9. The yield of synthetic products amounted to 120 g. per m.$^3$ active gas. The liquid products contained over 70% of a valuable gasoline which, in its turn, contained about 70% alkene hydrocarbons and had an octan number 69 (CFR). By adding tetraethyl lead an octan number 81 could be obtained.

About one half of the totally obtained synthetic products consisted of "gasole" with a propylene content of 20–30%.

Example 9

By precipitating suitable salt solutions with the aid of alkali hydroxide an oxide contact was prepared, which contained 33 parts Ca and 5 parts Cu to 100 parts Fe. It was started under normal pressure with watergas at 245° C. (=473° F.) and after a 32% contraction was obtained a synthesis pressure of 20 atm. overpressure was applied. The synthesis gas was passed over the contact once. After approximately 200 hours liquid products were already obtained, of which about one half, namely 49.6%, consisted of paraffine hydrocarbons, boiling above 320° C. (=608° F.)

In order to diminish the "starting time" or "induction period" of the catalyser about 2–5% Ni, Co or Cu were added to the contacts, as has already been mentioned in the above. Thereby the unreduced contacts are brought into operation more quickly, as appears from the following data (synthesis at normal pressure, watergas, 245° C.) (=473° F.)

Contact: 100 Fe, 33 Ca, no addition, 20% contraction after about 112 working hours.

Contact: 100 Fe, 33 Ca, 5 Ni, 20% contraction after about 68 working hours.

Contact: 100 Fe, 33 Ca, 5 Cu, 20% contraction after about 16 working hours.

It was observed that with an addition of Ni, low boiling but pure-white paraffine and, with an addition of Cu, higher boiling but somewhat yellow paraffine, were obtained.

By the later impregnation of the precipitated and washed contacts with an alkali hydroxide solution a much better activity can be obtained, as appears from the following comparison.

Two oxide contacts, which contained 100 parts Fe and 33 parts Ca, were put into working, the first with an alkali impregnation, the second without such treatment. A 22% contraction was obtained with the contact that had not been impregnated only after 398 working hours; but with the impregnated contact already after 206 working hours.

In order to perform the impregnation with alkali hydroxide, first the precipitated mass may be thoroughly washed and then impregnated with hydroxide. However, in order to save time and washing water, one may also use diluted sodium- or potassium hydroxide, for example $1/20$ normal hydroxide-solution, instead of water for the last part, for instance the second half, of the necessary washing.

The iron catalysers prepared according to the invention may also be used on supports according to choice, for instance on infusorial earth, diatomite power, finely powdered MgO, pumice powder, clay powder etc. These contacts were first reduced at 245° C. (=473° F.) for 30 hours with 10 liters $H_2$ per hour. In the synthesis at normal pressure, by way of example, the following results were obtained in 150 working hours.

An oxide catalyser, which contained about 100 parts infusorial earth to 100 parts Fe, 10 parts Mn and 5 parts Cu, gave a maximum contraction of 32% and an oil yield of 31 cm.$^3$ per m.$^3$ watergas.

An oxide contact, which contained about 100 parts infusorial earth to 100 parts Fe, 10 parts Mn and 5 parts Co, gave 26% gas volume n-contraction and 37 cm.$^3$ liquid products per m.$^3$ watergas.

With a hydrogenation contact, which contained about 40 parts infusorial earth to 100 parts Fe, 30 parts Ca and 2 parts Cu in the form of their oxides, a contraction of 33% and an oil yield of 37 cm.$^3$ per m.$^3$ watergas was obtained.

Instead of the watergas used in the above examples, other mixtures of carbon oxide and hydrogen can also be used. The best yields are obtained with a CO/G-proportion of 1:1.2 up to 1:1.5.

From the figures given in the above examples it is apparent that the new iron catalysers are very suitable for the preparation of valuable gasoline (see Example 8), as well as for the efficient preparation of high melting paraffine. In this respect technically and economically they make a very valuable contribution to the development of carbon oxide-hydrogenation which, till now, was scarcely considered possible.

It is well known, that it is difficult to filter and to wash the precipitates of heavy metal-hydroxides. It has now been found that according to the invention all iron precipitates which contain sufficient quantities of calcium can be filtered and washed much more easily than iron precipitates containing no calcium, whether with or without other activating additions. These differences are already apparent in small laboratory experiments, but they are very obvious in the treatment of large quantities for industrial purposes, it being almost impossible to filter certain iron precipitates.

What we claim is:

1. In a process for the production of liquid and solid hydrocarbons by passing a mixture of carbon monoxide and hydrogen under a superatmospheric pressure of about 10–20 atmospheres over an iron-containing mixed catalyst prepared by coprecipitation of the catalyst components, and withdrawing the thus formed hydrocarbons, the improvement which comprises preparing the catalyst by coprecipitating an iron compound with a calcium compound from solutions of iron and calcium salts of an acid selected from the group consisting of hydrochloric and nitric acids using alkali hydroxide as the precipitant and washing the soluble material from the precipitate, the amount of the calcium compound in the resulting mixed catalyst ranging from 10–50% of the total weight of the compounds calculated as oxides.

2. In a process for the production of liquid and solid hydrocarbons by passing a mixture of carbon monoxide and hydrogen under a superatmospheric pressure of about 10–20 atmospheres over an iron-containing mixed catalyst prepared by coprecipitation of the catalyst components, and withdrawing the thus formed hydrocarbons, the improvement which comprises preparing the catalyst by coprecipitating an iron compound with a calcium compound from solutions of iron and calcium salts of an acid selected from the group consisting of hydrochloric and nitric acids using alkali hydroxide as the precipitant and washing the soluble material from the precipitate, the amount of the calcium compound in the resulting mixed catalyst ranging from 10–50% of the total weight of the compounds calculated as oxides, and incorporating into the mixed catalyst as additional active components about 2–5% of at least one metal selected from the group consisting of nickel, cobalt and copper.

HEINRICH HECKEL.
OTTO ROELEN.